US010213878B2

(12) United States Patent
Schroth et al.

(10) Patent No.: US 10,213,878 B2
(45) Date of Patent: Feb. 26, 2019

(54) ARC WELDING/BRAZING PROCESS FOR LOW-HEAT INPUT COPPER JOINING

(71) Applicant: GM GLOBAL TECHNOLOGY OPERATIONS LLC, Detroit, MI (US)

(72) Inventors: James G. Schroth, Troy, MI (US); Thomas A. Perry, Bruce Township, MI (US); John S. Agapiou, Rochester Hills, MI (US); Ronald M. Lesperance, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 461 days.

(21) Appl. No.: 14/996,549

(22) Filed: Jan. 15, 2016

(65) Prior Publication Data

US 2016/0218603 A1 Jul. 28, 2016

Related U.S. Application Data

(60) Provisional application No. 62/107,045, filed on Jan. 23, 2015.

(51) Int. Cl.
*B23K 35/22* (2006.01)
*B23K 9/00* (2006.01)
(Continued)

(52) U.S. Cl.
CPC .......... *B23K 35/222* (2013.01); *B23K 1/0016* (2013.01); *B23K 1/19* (2013.01);
(Continued)

(58) Field of Classification Search
CPC .. B23K 1/0016; B23K 1/0018; B23K 9/0008; B23K 1/19; B23K 35/222; H02K 15/0068; H02K 2203/12
(Continued)

(56) References Cited

U.S. PATENT DOCUMENTS 4,270,037 A * 5/1981 Grinin .................. B23K 9/1675
219/124.02
4,366,362 A * 12/1982 Ohta ...................... B23K 9/167
219/123

(Continued)

OTHER PUBLICATIONS

Huang Yong; Sheet metal and welding engineering for vehicle maintenance and repair, National Defend Industry Press, pp. 83-84, Jan. 2007.
(Continued)

*Primary Examiner* — Jimmy Chou
(74) *Attorney, Agent, or Firm* — Reising Ethington P.C.

(57) ABSTRACT

An arc welding/brazing process is disclosed that is useful to join together a first copper piece and a second copper piece without damaging more heat-sensitive materials that may be located nearby is disclosed. The arc welding/brazing process includes using a non-consumable electrode wire, which electrically communicates with a weld control in a straight polarity orientation, to strike an arc across a gap established between a leading tip end of the electrode wire and the first copper piece. The current that flows through the arc when the arc is established heats the first copper piece such that the first copper piece becomes joined to a second copper piece. The joint between the first copper piece and the second copper piece may be an autogenous weld joint or a braze joint.

20 Claims, 6 Drawing Sheets

(51) Int. Cl.
    *B23K 9/23*     (2006.01)
    *B23K 1/19*     (2006.01)
    *B23K 1/00*     (2006.01)
    *B23K 9/167*     (2006.01)
    *H02K 3/50*     (2006.01)
    *H02K 15/00*     (2006.01)
    *B23K 103/12*     (2006.01)
    *B23K 101/32*     (2006.01)
    *B23K 101/36*     (2006.01)

(52) U.S. Cl.
    CPC ............ *B23K 9/0008* (2013.01); *B23K 9/167* (2013.01); *B23K 9/23* (2013.01); *H02K 3/50* (2013.01); *H02K 15/0081* (2013.01); *B23K 2101/32* (2018.08); *B23K 2101/36* (2018.08); *B23K 2103/12* (2018.08)

(58) Field of Classification Search
    USPC ............... 219/124.01, 124.02, 130.21, 130.4
    See application file for complete search history.

(56) References Cited

U.S. PATENT DOCUMENTS

| | | | | |
|---|---|---|---|---|
| 4,877,940 A * | 10/1989 | Bangs | .................. | B23Q 35/127 219/124.34 |
| 5,916,464 A * | 6/1999 | Geiger | ................ | B23K 9/1336 219/130.4 |
| 6,753,497 B1 * | 6/2004 | Matus | .................... | B23K 9/067 219/121.45 |
| 8,124,913 B2 * | 2/2012 | Artelsmair | ............. | B23K 9/092 219/130.21 |
| 2003/0038118 A1 * | 2/2003 | Sun | ........................ | B23K 11/11 219/117.1 |
| 2004/0050832 A1 * | 3/2004 | Mortendorfer | ...... | B23K 3/0384 219/127 |
| 2010/0301030 A1 * | 12/2010 | Zhang | .................. | B23K 9/0953 219/130.1 |
| 2013/0299463 A1 * | 11/2013 | Kanemaru | ............. | B23K 9/167 219/74 |
| 2014/0083989 A1 * | 3/2014 | Koprivnak | ........... | B23K 9/0738 219/130.4 |
| 2014/0131331 A1 * | 5/2014 | Koprivnak | ........... | B23K 9/0738 219/130.21 |
| 2014/0203006 A1 * | 7/2014 | Koprivnak | ........... | B23K 9/0738 219/130.4 |
| 2015/0001185 A1 * | 1/2015 | Kanemaru | ............. | B23K 9/295 219/75 |
| 2015/0076119 A1 * | 3/2015 | Hsu | ...................... | B23K 9/0956 219/74 |
| 2015/0096962 A1 * | 4/2015 | Sigler | .................... | B23K 11/20 219/91.2 |
| 2015/0129581 A1 * | 5/2015 | Cole | ..................... | B23K 9/1087 219/60 A |
| 2015/0231727 A1 * | 8/2015 | Oh | ......................... | B23K 9/167 219/130.1 |
| 2015/0251281 A1 * | 9/2015 | Hebuterne | ............. | B23K 9/124 219/76.14 |
| 2015/0352654 A1 * | 12/2015 | Onishi | .................. | B23K 11/115 219/130.01 |
| 2016/0144441 A1 * | 5/2016 | Bruck | .................... | B23K 35/322 219/75 |
| 2016/0175975 A1 * | 6/2016 | Lattner | .................. | B23K 9/067 219/137.71 |

OTHER PUBLICATIONS

Guo Xuezhu, Training materials for oilfield ground engineering construction safety, China University of Petroleum Press, p. 128, Oct. 2008.

* cited by examiner

ARC WELDING/BRAZING PROCESS FOR LOW-HEAT INPUT COPPER JOINING

This application claims the benefit of U.S. provisional patent application No. 62/107,045, filed on Jan. 23, 2015, the entire contents of which are hereby incorporated by reference.

TECHNICAL FIELD

The technical field of this disclosure relates generally to copper joining processes and, more particularly, to a controllable low-heat input copper joining process.

BACKGROUND

The assembly of certain types of components may require metal parts to be joined by welding or brazing without thermally damaging nearby portions of the same component that may be more sensitive to heat. For example, when assembling a stator of an electric motor, the copper wires of different phase windings distributed around the stator core typically have to be joined to a copper tab within a connection ring in order to electrically connect the phase windings to an external power source. The copper tab is usually held in a polymer body and includes a depressed well that receives protruding ends of the copper wires. These protruding ends of the copper wires have to be welded or brazed to the copper tab within the depressed well without thermally damaging the surrounding polymer body, the enamel that surrounds the copper wires, the insulation between stator core laminations, and/or the insulation within the stator core slots. Moreover, to further complicate the joining process, only single-side access is typically available to the protruding ends of the copper wires, which limits the available welding/brazing techniques that can be employed.

SUMMARY OF THE DISCLOSURE

An arc welding/brazing process for joining a first copper piece and a second copper piece is disclosed. The arc welding/brazing process can be employed to join the first and second copper pieces in a wide range of applications, especially those in which heat-sensitive materials are present near the joining site. For example, as discussed below, the arc welding/brazing process may be used to join together a copper wire of an electromagnetic polyphase stator winding and a copper tab of a connection ring that is fitted onto the stator winding to facilitate delivery of electric current to the stator winding. In that scenario, a protruding end of the copper wire is received through a hole in the copper tab and needs to be joined to the tab without damaging a variety of nearby materials that are susceptible to thermal damage. A plurality of these wire-to-tab joints typically need to be made to complete the assembly of a stator component of an electric motor.

The disclosed arc welding/brazing process uses a nonconsumable electrode wire, which electrically communicates with a weld control in a straight polarity orientation, to strike an arc across a gap established between a leading tip end of the electrode wire and the first copper piece. The current that flows through the arc when the arc is established heats the first copper piece and thereby causes the first copper piece and the second copper piece to become joined either by an autogenous weld joint or a braze joint depending on the particulars of the process. A variety of parameters of the arc welding/brazing process can be controlled to limit the amount heat input into the copper pieces that exceeds what is needed to attain the desired joint between the copper pieces. Such control of the overall heat input is helpful in mitigating the thermal damage to heat sensitive materials that may be present in the vicinity of the joining site.

DETAILED DESCRIPTION

Figure 1:
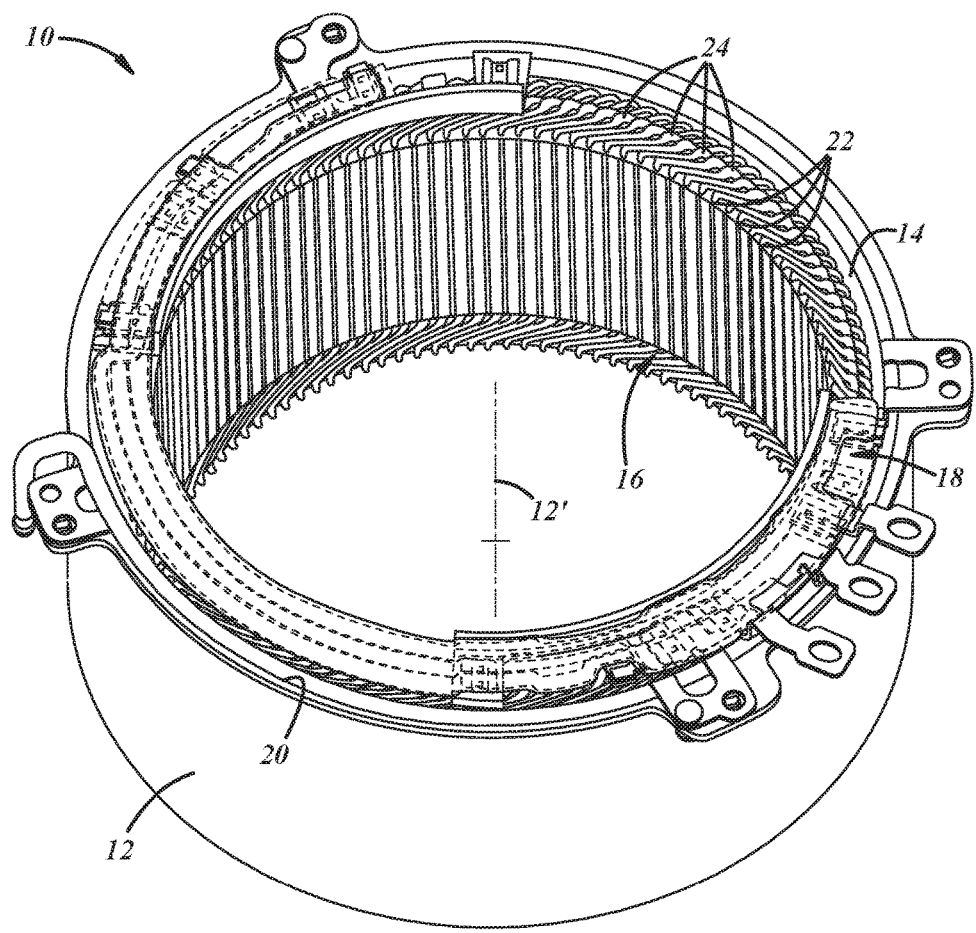
FIG. 1 is a perspective view of an electric motor stator for an automobile application.
Figure 2:
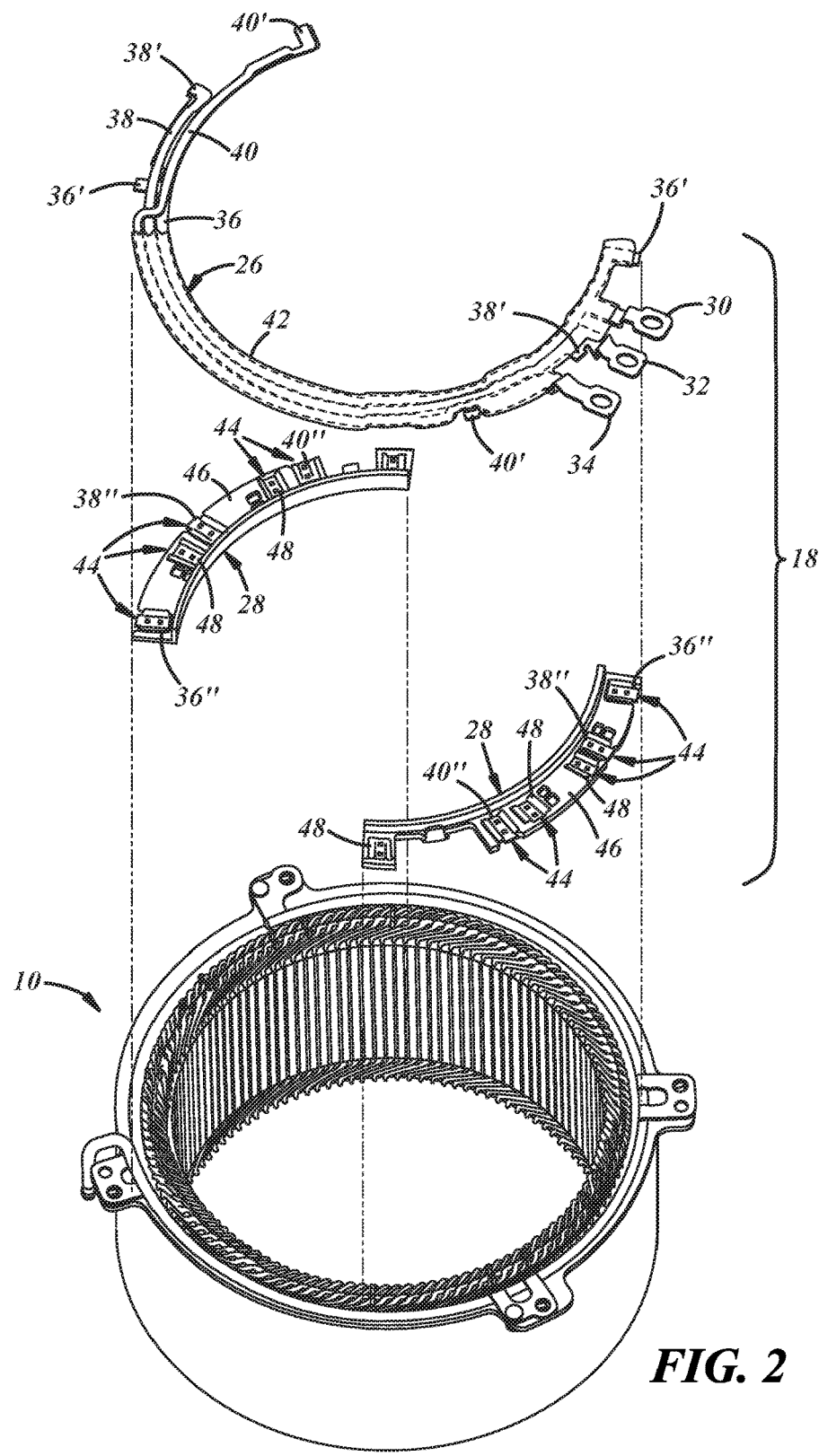
FIG. 2 is an exploded perspective view of the electric motor stator shown in FIG. 1 with the upper and lower ring carriers of the connection ring separated from each other.

The need to join metal portions of a component without damaging or otherwise thermally degrading other portions of the component that are more sensitive to the attendant heat that accompanies the joining process is a manufacturing constraint that may arise in a variety of contexts. In particular, as demonstrated here and shown in FIGS. 1-3, a stator 10 for a 3-phase AC automobile electric motor may require a number of localized joints to be made between highly thermally- and electrically-conductive copper pieces that are in close proximity to more heat-sensitive electrically-insulating materials. Avoiding unacceptable thermal degradation to such electrically-insulating materials during the joining process helps ensure the automobile electric motor operates as efficiently as possible. Unfortunately, the preservation of electrically-insulating materials in close proximity to the copper joining locations has proven difficult to consistently achieve in the tight spatial confines of the stator 10. The devices and methods disclosed in more detail below are intended to address this problem. And while these devices and methods are described specifically with respect to the stator 10 shown here, they may also be used for other applications despite not being explicitly described here as will be understood by those skilled in the art.

The stator 10 is the stationary part of the electric motor (induction or permanent magnet) that cooperates with a rotor (not shown) to transmit torque to an axel or shaft. The stator 10 includes a housing 12, a ferromagnetic stator core 14, an electromagnetic polyphase stator winding 16, and a connection ring 18. The housing 12, which is typically constructed of cast iron or steel, is a cylindrical support structure having a central stator axis 12'. The housing 12 functions to support and protect the stator core 14 and the stator winding 16 and to provide overall mechanical strength to the stator 10. The ferromagnetic stator core 14 is disposed along an inner circumferential wall 20 of the housing 12. The stator core 14 is preferably constructed of axially-stacked insulated laminations of a ferromagnetic material such as, for example, insulated laminations of silicon steel (Fe—Si). The stator core 14 defines a plurality of axially-extending slots 22 that are circumferentially-spaced around the stator axis 12'.

The electromagnetic polyphase stator winding 16 includes multiple distinct phase windings comprised of copper wires 24 that, here, are in the form of rectangular-sectioned copper bars. The copper wires 24 of each phase winding are wound through multiple slots 22 of the stator core 14 in a way that establishes one or more pairs of opposed magnetic poles when an electrical current is delivered to that particular phase winding. The multiple phase windings, in turn, are alternately arranged around the stator core 14 so that electric current can be delivered to the different phase windings in a rotating three-phase progression, which causes the stator winding 16 to generate a rotating magnetic field that is amplified by the stator core 14. In order to keep the copper wires 24 of the distinct phase windings from short-circuiting one another, especially in an automobile electric motor, an enamel coating is typically applied to the outer surface of the copper wires 24 and a polymer or paper insulation material is disposed between the copper wires 24 and the stator core 14 within the slots 22.

The connection ring 18 facilitates delivery of electric current to the electromagnetic polyphase stator winding 16. Here, as shown best in FIGS. 2-4, the connection ring 18 includes an upper ring carrier 26 and two lower ring carriers 28. The upper carrier 26 has three phase leads 30, 32, 34 that are electrically connectable to a power source such as an inverter powered by a high-voltage battery pack. Each phase lead 30, 32, 34 is coupled to a copper conductor band 36, 38, 40 housed within and extending through an upper polymer body 42 (partially broken away) side-by-side the other conductor bands. Upper phase lead tabs 36', 38', 40' associated with each copper conductor band 36, 38, 40 extend outward from the upper polymer body 42 and are hence exposed. The upper polymer body 42 may be composed of a wide variety of electrically-insulating polymers including, for example, nylon.

Figure 3:
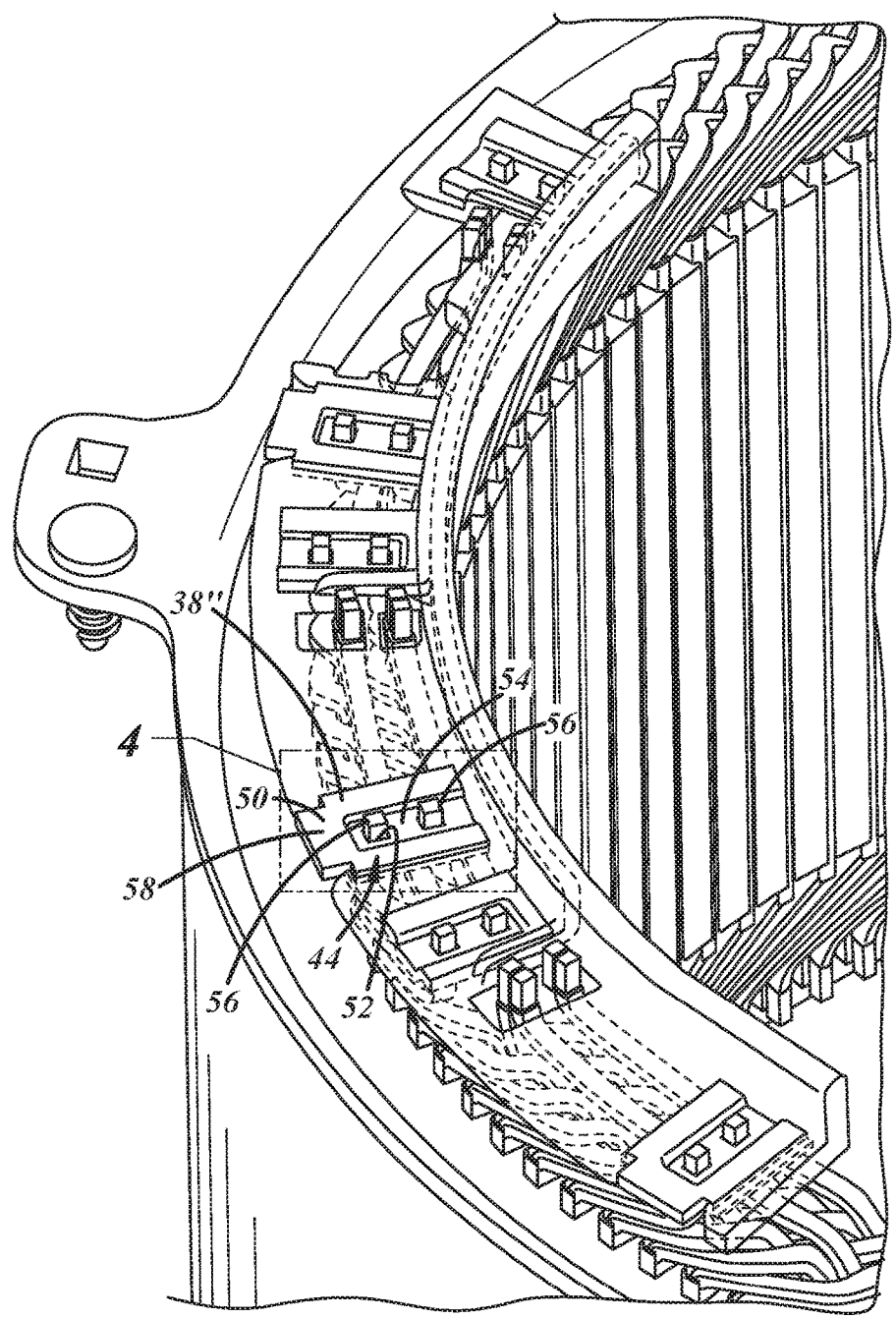
FIG. 3 is a magnified perspective view of one of the lower ring carriers of the connection ring disposed onto the electromagnetic polyphase stator winding.
Figure 4:
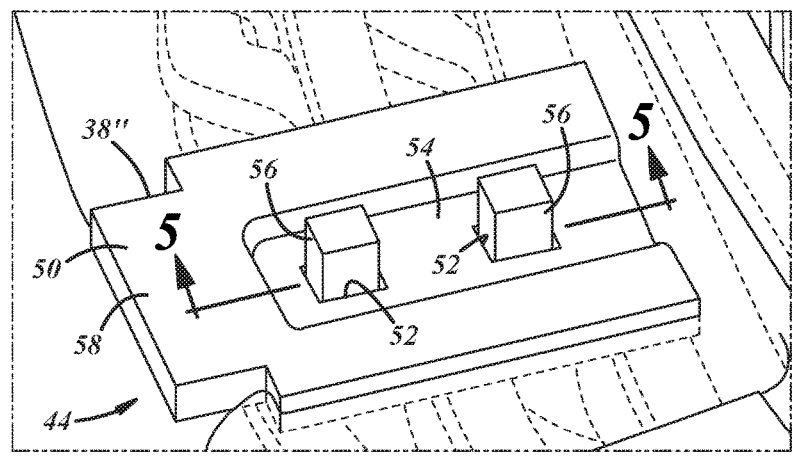
FIG. 4 is a magnified perspective view of one of the copper tabs shown in FIG. 3 having protruding ends of two copper wires received through holes in the copper tab.
Figure 6A:
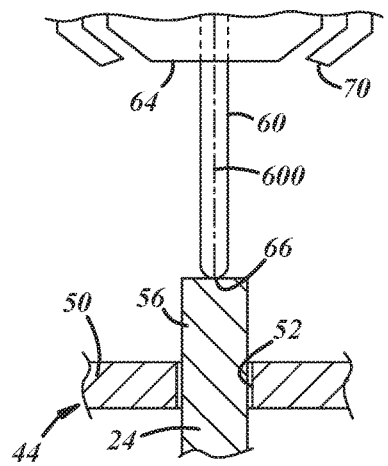
FIGS. 6A-6D schematically depict the steps of an autogenous arc welding process that can be performed by the arc welding/brazing apparatus of FIG. 5 according to one embodiment of the disclosure.

The two lower ring carriers 28 include a plurality of individual copper tabs 44 held by a lower polymer body 46. The copper tabs 44 include lower phase lead tabs 36", 38", 40" and layer jumper tabs 48. Similar to before with the upper ring carrier 26, the lower polymer bodies 46 may be composed of a wide variety of electrically-insulating polymers including, for example, nylon. Each of the copper tabs 44 held by the lower polymer bodies 46 includes a body 50 that defines a pair of holes 52 within a depressed well 54 (FIGS. 3-4). The holes 52 are sized for receiving protruding ends 56 of the copper wires 24 associated with one of the phase windings. The lower phase lead tabs 36", 38", 40", moreover, additionally include joining tab ends 58 that confront and are joined to the upper phase lead tabs 36', 38', 40' of the upper ring carrier 26 when the connection ring 18 is assembled. In this way, electrical current can be delivered by the three phase leads 30, 32, 34, through the copper conductor bands 36, 38, 40 and the joined upper 36', 38', 40' and lower 36", 38", 40" phase lead tabs, and to the several distinct phase windings of the stator winding 16 in a rotating three-phase progression. The resultant rotating magnetic field that is generated in the stator winding 16 and amplified by the stator core 14 ultimately drives rotation of the rotor.

Referring now specifically to FIG. 4, which is a magnified view of one of the copper lower phase lead tabs 38" of one of the lower ring carriers 28, the protruding ends 56 of two copper wires 24 are received by and extend through the holes 52 in the depressed well 54 when the lower carrier ring 28 is located on the stator winding 16. The other copper tabs 44—i.e., the other eleven copper tabs 44 shown in FIG. 2—also receive protruding ends 56 of a pair of copper wires 24 in the same way. The copper wires 24 associated with each of the copper tabs 44 need to be joined in place to their respective copper tab 44 to electrically connect the several phase windings to their intended phase leads 30, 32, 34. This can be accomplished by an arc welding/brazing process that is controllable to deliver precisely the amount of heat needed to autogenously weld or braze the copper wires 24 to their copper tabs 44 without thermally degrading other nearby electrically-insulating materials to an operationally unacceptable extent. For the sake of brevity, the arc welding/brazing process will be further describe below with respect to a single pair of copper wires 24 and a single copper tab 44. The arc welding/brazing process could, of course, be similarly used to perform the same function at the other copper tabs 44 of the two lower ring carriers 28.

The fact that the arc welding/brazing process employed here can join the protruding ends 56 of each copper wire 24 to the copper tab 44 in repeated fashion while preserving the operational integrity of any surrounding electrically-insulating materials is not inconsequential. As indicated above, there are several different types of electrically-insulating materials that can possibly degrade thermally if subjected to excessive heat—namely, the polymer bodies 42, 46 of the upper ring carrier 26 and the lower ring carriers 28, the enamel coating on the exterior surfaces of the copper wires 24, and the insulation around the copper wires 24 in the slots 22 of the stator core 14. And given the magnitude of the voltage differential between phases in the stator winding 16—e.g., upwards of hundreds of volts during operation of the motor to induce the rotating magnetic field needed to supply vehicle-appropriate torque—the integrity of any electrically-insulating materials included within the stator 10 should be preserved to the greatest extent possible.

Protecting the electrically-insulating materials near the copper wires 24 and the copper tabs 44 from the heat generated during joining is a challenge given the very high thermal and electrical conductivity of copper. Indeed, if the energy delivered by the arc is too small, it will simply conduct through the copper wires 24 away from the joining site without providing the localized heat needed for welding/brazing. On the other hand, if the energy delivered by the arc is too great, the heat generated in excess of what is needed to weld/braze the copper wires 24 in place will reach the surrounding electrically-insulating materials and risk thermally degrading them. The arc welding/brazing process used here, which is described in greater detail below, is designed to address the challenge of welding/brazing copper pieces that are confined to tight quarters with other more heat-sensitive materials. Additionally, the arc welding/brazing process can be practiced even if only single-side access to the joining site of the copper pieces is available.

Figure 5:
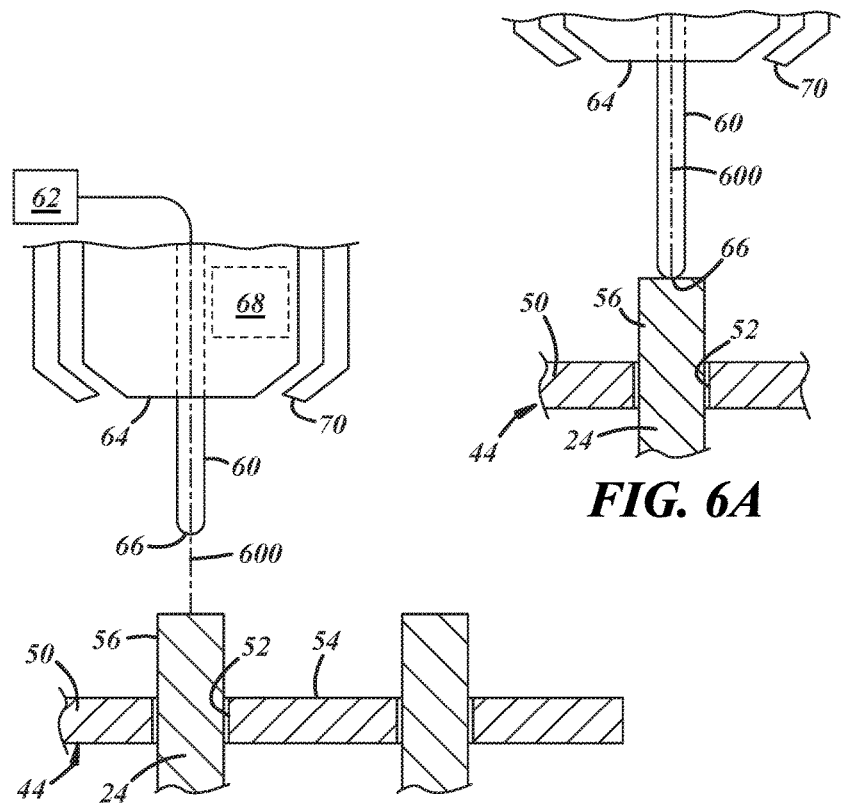
FIG. 5 is a schematic illustration of an arc welding/brazing apparatus.

The arc welding/brazing process is controllable to deliver current to a joining site at or around each of the copper wires 24, one after another, so that the generated heat closely matches the heat required to join the protruding ends 56 of the copper wires 24 to the copper tab 44. In practice, and as shown schematically in FIG. 5, the arc welding/brazing process employs a non-consumable electrode wire 60, preferably a tungsten wire, in electrical communication with a weld control 62 to strike a single arc at a joining site on the copper wire 24 while controlling several parameters of the process that enable the right amount of heat to be generated over a small time frame. The use of a non-consumable wire—as opposed to a consumable wire like that used in conventional MIG welding—permits more precise control of the current delivered by the arc since the length of the wire 60 remains constant while the arc is flowing, which avoids current fluctuations and other dynamic process variations that make precision heat control more difficult to realize with a consumable wire. The term "welding/brazing" as used herein refers to the flexibility of the process to either (1) autogenously weld each of the copper wires 24 to the copper tab 44 or (2) melt a pre-placed brazing material that wets and bonds each of the copper wires 24 to the copper tab 44. Each type of joining process will be described in more detail below.

The non-consumable electrode wire 60 can be fed to and carried by any capable arc welding/brazing apparatus. For example, as shown here in FIG. 5, the non-consumable electrode wire 60 extends outwardly from a guide nozzle 64 along an extended longitudinal axis 600. The non-consumable electrode wire 60 has a leading tip end 66 and is axially moveable—both protractible and retractable—along the longitudinal axis 600 by a wire modulator 68 such as a servo-motor. A shield gas nozzle 70 disposed concentrically around the guide nozzle 64 dispenses a shield gas around the non-consumable electrode wire 60 to inhibit atmospheric contamination of the weld site and the electrode wire 60 when an arc is flowing. The shield gas may be an inert gas such as argon, helium, or a combination of argon and helium, a reactive gas such as carbon dioxide, or some other suitable gas or gas mixture. While the non-consumable electrode wire 60 can vary in composition and size, in many instances, a tungsten wire having a diameter 1.0 mm is useful.

The weld control 62 electrically communicates with the non-consumable electrode wire 60 and supplies DC current in a straight polarity orientation; that is, the non-consumable electrode wire 60 is designated "electrode negative," meaning that current flows from the work joining site to the electrode wire 60 when an arc is struck (in other words, electrons flow from the electrode wire 60 to the joining site). The weld control 62 may be any type of welding power supply that is integrated with computer control functionality and a program interface by which a variety of process parameters can be specified and entered, such as those available through Fronius USA. Some of the process parameters that can be programmed into, and controlled by, the weld control 62 include: (1) the amount of electric current flowing through the arc; (2) the velocity at which the non-consumable electrode wire 60 can move along its longitudinal axis 600; and (3) the amount of time the non-consumable wire 60 is moving along its longitudinal axis 600 at a prescribed velocity which, indirectly, defines a distance between the leading tip end 66 and the copper wire 24. By controlling these and other process parameters, as will be further explained below, the arc welding/brazing process and the resultant heat input can be precisely managed.

Autogenous Arc Welding Process

The arc welding/brazing process can be practiced to autogenously weld each of the copper wires 24 to the copper tab 44 in the manner represented generally in FIGS. 6A-6D. To begin, the ferromagnetic stator core 14 and the electromagnetic polyphase stator winding 16 are assembled together and then disposed along the inner circumferential wall 20 of the housing 12. Next, the lower ring carriers 28 are fitted onto the stator winding 16. This is accomplished by lowering the lower ring carriers 28 onto the stator winding 16 such that the protruding ends 56 of the various pairs of copper wires 24 are received in, and pass through, the corresponding holes 52 of the copper tabs 44. Some portion of the copper wire(s) 24 to be joined may be grounded at this time. The arc welding/brazing apparatus is then located near one of the copper tabs 24 in preparation for welding/brazing. In a preferred embodiment, the arc welding/brazing apparatus is robotically located with the aid of automation equipment, although it is certainly acceptable to bring the assembled stator components to a stationary arc welding/brazing apparatus and/or to manually position the arc welding/brazing apparatus and the assembled stator components relative to one another.

Each of the two protruding ends 56 of the copper wires 24 is separately autogenously welded to the copper tab 44 (i.e., one after another) by the arc welding/brazing apparatus. In each instance, the autogenous arc welding process includes four stages, which are schematically illustrated in FIGS. 6A-6D. These stages are (1) the arc initiation stage, (2) the wire retraction stage, (3) the wire advancement stage, and (4) the arc extinguishment stage. In the arc initiation stage (FIGS. 6A-6B), the leading tip end 66 of the non-consumable electrode wire 60 is protracted along its longitudinal axis 600 until it makes contact with the protruding end 56 of the copper wire 24. The weld control 62 then operates to supply DC current to the non-consumable electrode wire 60 according to programmed instructions. The amount of current delivered to the non-consumable electrode wire 60 is set so that an arc will be struck when the leading tip end 66 is subsequently separated from contact with the copper wire 24. The exact amount of this applied current depends on the size of the copper wire 24 and the composition and diameter of the wire 60. For example, a current of between 150 A and 250 A, and preferably 200 A, is appropriate for a 1 mm diameter tungsten electrode wire that is brought into contact with a copper wire having 2 mm by 2 mm rectangular cross-section.

Figure 6B:
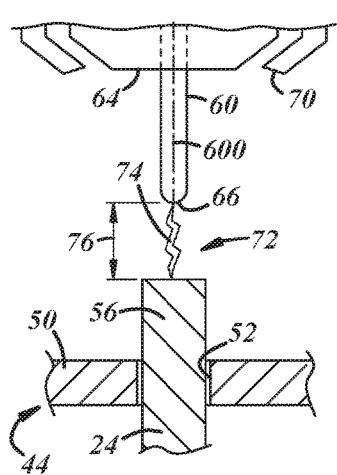
Figure 6C:
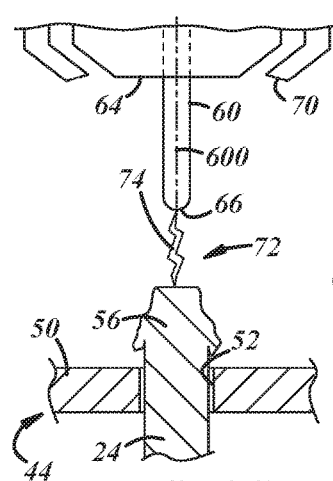
Figure 6D:
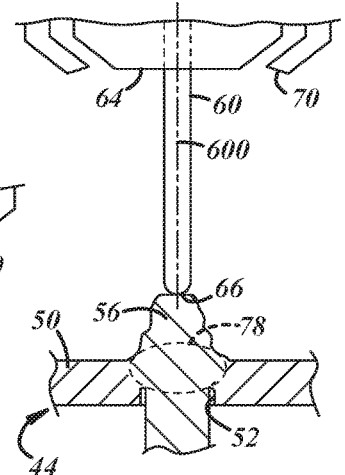

While still operating in the arc initiation phase, the non-consumable electrode wire 60 is retracted from contact with the copper wire 24 along its longitudinal axis 600, resulting in a gap 72 being formed that covers a distance between the leading tip end 66 of the electrode wire 60 and the copper wire 24 (FIG. 6B). The ensuing voltage drop across the gap 72 causes an arc 74 to be struck between the leading tip end 66 of the non-consumable electrode wire 60 and the copper wire 24 with current flowing into the tip end 66 of the wire 60 due to the straight polarity coupling with the weld control 62. The current flowing through the arc 74 from the copper wire 24 into the electrode wire 60, in turn, heats and initiates melting of the copper wire 24. In an effort to better control the initial heat flux into the copper wire 24 over the course of the autogenous welding process, the leading tip end 66 of the non-consumable electrode wire 60 may be initially retracted to a standoff distance 76 away from the copper wire 24 to stabilize the voltage drop across the gap 72. The exact standoff distance may vary depending on factors such as the size of the copper wire 24, the composition and diameter of the non-consumable electrode wire 60, and the current flowing through the arc 74. As an example, though, a 0.7 mm to 1.3 mm standoff distance is generally applicable for a 1 mm tungsten electrode wire exchanging 200 A with a 2 mm by 2 mm rectangular cross-section copper wire.

The wire retraction phase (FIGS. 6B-6C) begins after the leading tip end 66 of the non-consumable electrode wire 60 has reached the standoff distance 76. In this phase, the non-consumable electrode wire 60 can, optionally, be further retracted along its longitudinal axis 600 to increase the size of the gap 72 and, thus, the distance between the leading tip end 66 of the electrode wire 60 and the copper wire 24. Further retraction of the non-consumable electrode wire 60 allows for the heat flux and the overall heat input into the copper wire 24 to be additionally varied in a controlled fashion. Specifically, when the distance of the gap 72 is increased while the arc 74 is flowing, the voltage drop across the gap 72 responds in order to sustain the programmed amount of current flow but over a greater area. Several process parameters that can be programmed into the weld control 62 and controlled during the wire retraction phase include the velocity at which the non-consumable electrode wire 60 is retracted, the amount of current flowing through the arc 74 during retraction, and the time the electrode wire 60 is retracting (and thus the distance of the gap 72), to name but a few. While these process parameters can be adjusted over wide ranges to fit the particular autogenous arc welding process being performed, in many instances the retraction velocity can be set between 0 and 600 ipm (inches per minute), the current can be set to between 80 A and 300 A, and the retraction time can be set between 30 ms and 150 ms.

The heat flux into the copper wire 24 can be increased, decreased, or kept the same during the wire retraction phase by varying some or all of the previously-recited process parameters. For example, the heat flux can be increased by instructing the weld control 62 to retract the non-consumable electrode wire 60 at a velocity over a period of time to increase the distance of the gap 72 between the leading tip end 66 of the non-consumable electrode wire 60 and the copper wire 24, all the while keeping the amount of current flowing through the arc 74 constant. In doing so, the voltage drop across the gap 72 will increase in order to maintain a constant current, which will generate more heat at the copper wire 24 and spread the current flowing through the arc 74 over a larger area. As another example, the heat flux can be reduced by instructing the weld control 62 to retract the non-consumable electrode wire 60 at a velocity over a period of time while reducing the amount of current flow. The resultant decrease in the voltage drop across the gap 72 will generate less heat at the copper wire 24. Furthermore, in yet another example, the non-consumable electrode wire 60 may not be retracted from the standoff distance at all (i.e., retraction velocity=0), but instead maintained in place for a period of time while varying the current, if needed, to keep the heat transfer rate constant throughout the wire retraction phase.

The wire advancement phase (FIG. 6C-6D) follows the wire retraction phase. In the wire advancement phase, the non-consumable electrode wire 60 is protracted along its longitudinal axis 600 so that the leading tip end 66 of the electrode wire 60 advances towards the copper wire 24 and lessens the distance of the gap 72. Advancement of the non-consumable electrode wire 60 provides yet another opportunity to vary and control the heat flux into the copper wire 24. Similar to before, when the distance of the gap 72 is decreased while the arc 74 is flowing, the voltage drop across the gap 72 responds in order to sustain the programmed amount current flow but over a lesser area. Here, in this phase, the process parameters programmed into the weld control 62 and controlled during the wire advancement phase include the velocity at which the non-consumable electrode wire 60 is advanced and the amount of current flowing through the arc 74 during advancement. The advancement time is generally not specified since closing the gap 72 by bringing the leading tip end 66 of the electrode wire 60 into contact with the copper wire 24 marks the end of the wire advancement phase. The heat flux into the copper wire 24 can be increased, decreased, or kept the same during the wire advancement phase by varying some or all of the previously-recited process parameters to produce the desired effects as discussed above. In many instances, like before, the advancement velocity can be set between 0 and 600 ipm (inches per minute) and the current can be set to between 80 A and 300 A.

Up until this point, and throughout the arc initiation, wire retraction, and wire advancement phases, the exchange of a controlled amount of current through the arc 74 has caused the copper wire 24 and possibly the copper tab 44 adjacent to the hole 52 to continuously melt and coalesce. Eventually, the wire extinguishment phase is initiated—as a consequence of the non-consumable electrode wire 60 being protracted (FIG. 6D)—when the leading tip end 66 of the electrode wire 60 re-engages and makes contact with the copper wire 24. At this point, the two wires 60, 24 are shorted and the arc 74 is extinguished, which halts heat flux into the copper wire 24 and copper tab 44. The leading tip end 66 of the electrode wire 60 is then retracted from the copper wire 24 without re-striking an arc to ensure the leading tip end 66 does not stick to the cooling copper wire 24. To help this final retraction take place during the arc extinguishment phase, an electrical current of short duration may be delivered to the electrode wire 60 as its retraction commences, with the current flowing into the tip end 66 of the wire 60 due to the straight polarity coupling with the weld control 62. The electrical current may, for example, be set between 170 A and 190 A, preferably 180 A, and last for a period of 3 ms to 5 ms.

The stoppage of heat flow into the copper wire 24 after the arc 74 has been extinguished allows the melted portions of the copper wire 24 and the copper tab 44 to solidify and fuse together, thereby forming an autogenous weld joint 78. The four phases of the autogenous arc welding process thus strike a single arc 74 between the non-consumable electrode wire 60 and the copper wire 24 that is sufficient to autogenously weld the copper wire 24 to the copper tab 44. And, here, as an additional benefit, the heat flux and the overall heat input can be precisely controlled by programming and adjusting as necessary various process parameters (e.g., arc initiation current, wire retraction velocity, retraction phase current, retraction phase time, wire advancement velocity, wire advancement time, etc.) so as to avoid undesirable thermal damage to nearby heat-sensitive materials.

A working example of the autogenous arc welding process involves joining a 2-mm by 2-mm rectangular cross-section copper wire to a copper tab of a lower ring carrier using a 1-mm diameter tungsten electrode wire electrically coupled in a straight polarity orientation to a weld control. To initiate an arc, the leading tip end of the tungsten electrode wire was protracted until it made contact with the copper wire. A current of 200 A was then delivered through the touching wires. Next, as part of the arc initiation phase, the tungsten wire was retracted to an initial standoff distance of 1 mm, and an arc was struck across the resultant gap. Then, during the wire retraction phase, which commenced after the tungsten wire reached the standoff distance, the wire was held in place (i.e., retraction velocity of 0) for 90 ms while exchanging a current of 200 A. After the wire retraction phase, the tungsten wire was advanced towards the copper wire at a velocity of 600 ipm while exchanging a current of 200 A like before in the wire retraction phase. Eventually, the leading tip end of the tungsten wire made contact with the copper wire and extinguished the arc (wire extinguishment phase). The leading tip end of the tungsten wire was then retracted from the copper wire without re-striking an arc while exchanging a current 180 A. The autogenous weld was then observed where it was seen that a successful weld joint was achieved without copper wire enamel damage or heat tinting of the copper tab. The process parameters in this example were thus controlled to form a fusion joint with the proper heat flux and overall heat input while minimizing the amount of heat that is conducted away from the joint toward the heat-sensitive system components.

Arc Brazing Process

Figure 7:
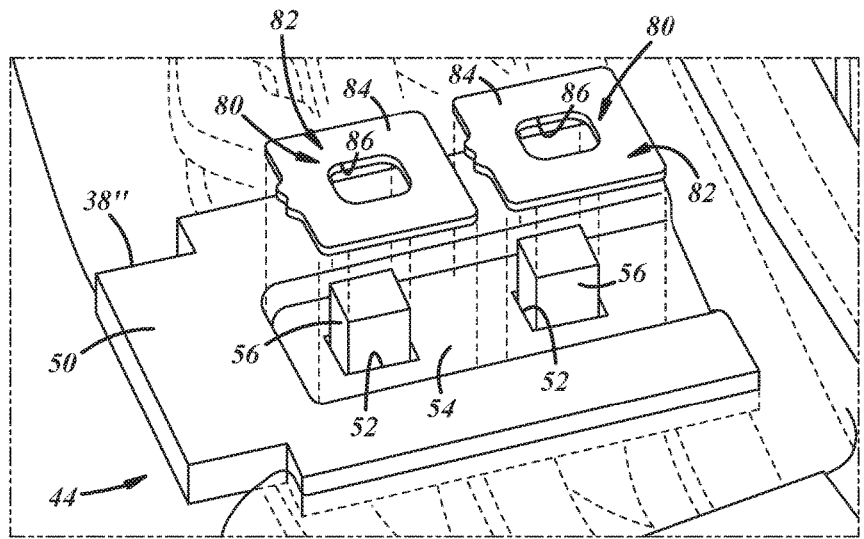
FIG. 7 is a magnified perspective view of one of the copper tabs shown in FIG. 3 having protruding ends of two copper wires received through holes in the copper tab and a pre-placeable solid brazing material.
Figure 8A:
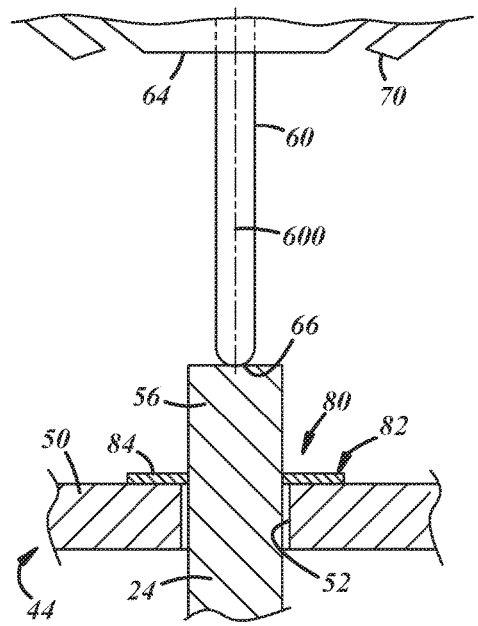
FIGS. 8A-8D schematically depict the steps of an arc brazing process that can be performed by the arc welding/brazing apparatus of FIG. 5 according to one embodiment of the disclosure.
Figure 8B:
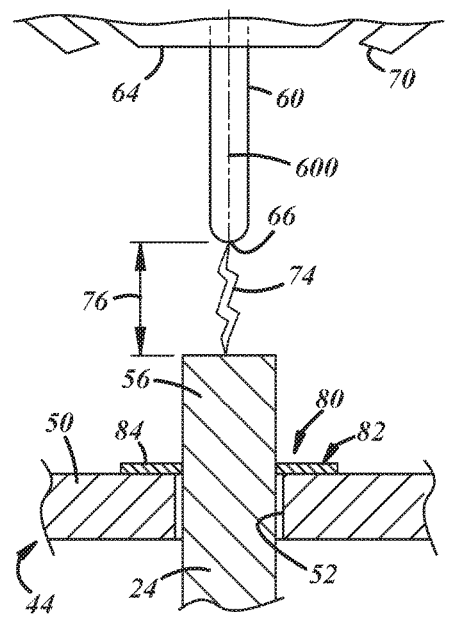
Figure 8C:
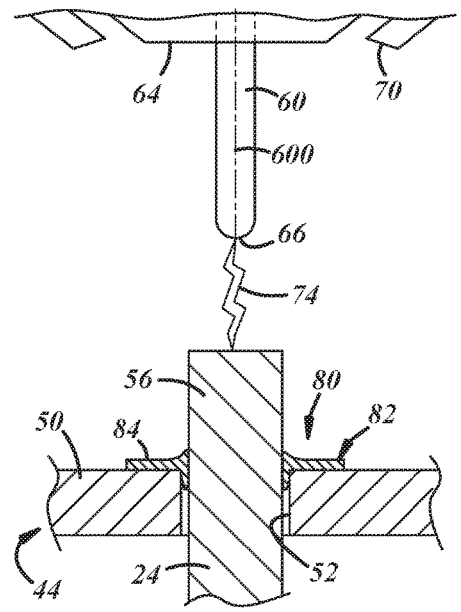
Figure 8D:
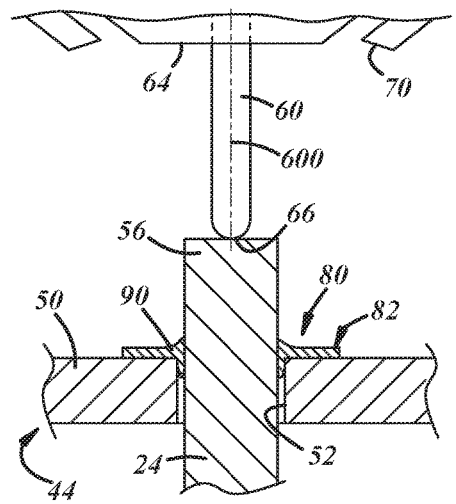

The arc welding/brazing process can also be practiced, if desired, to braze each of the copper wires 24 (one after the other) to the copper tab 44. To begin, like before with the autogenous welding embodiment, the lower ring carriers 28 are fitted onto the stator winding 16 after the stator core 14 and the stator winding 16 have been assembled together and disposed along the inner circumferential wall 20 of the housing 12. Some portion of the copper wire(s) 24 to be joined may be grounded at this time. The arc welding/brazing apparatus is then located near one of the copper tabs 44 as previously described. Here, however, as part of the arc brazing process, a pre-placeable solid brazing material 80 is placed next to the copper wire 24 within the depressed well 54 of the copper tab 44 before an arc is struck at the joining site, as shown in FIG. 7. The brazing material 80 may be composed of copper-silver-phosphorus (Cu—Ag—P) braze composition that includes, for example, on a weight percent basis, 70%-95% copper, 2%-20% silver, and 3%-8% phosphorus. Such a braze composition has a liquidus temperature (about 640° C.-820° C.) below the melting point of copper (about 1085° C.), and, additionally, is self-fluxing in that it removes oxides and other contaminants from the joining area upon melting and further shields the joining area from atmospheric contamination due to the high affinity that phosphorous has for oxygen.

Figure 9:
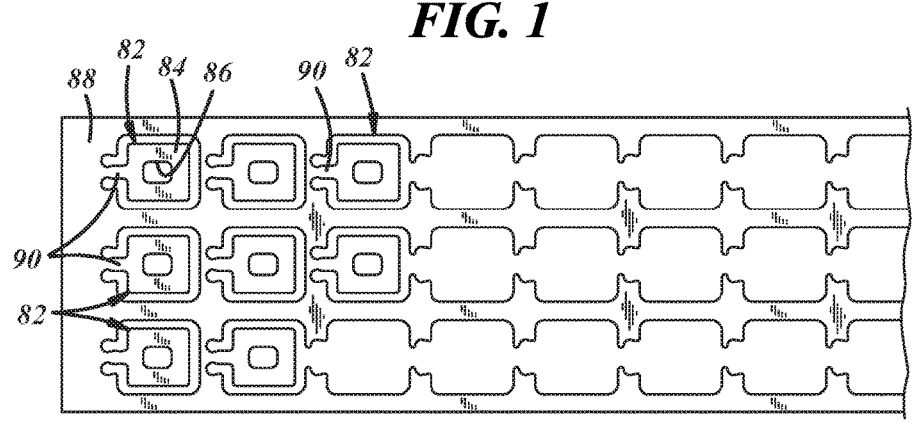
FIG. 9 is a plan view of a brazing material sheet that has a plurality of brazing material collars fashioned therein for use in the arc brazing process depicted in FIGS. 8A-8D.

The pre-placeable solid brazing material 80 may include a pre-placeable collar 82 that, as shown in FIG. 7, includes a rim portion 84 that defines a central opening 86. The pre-placeable collar 82 is retainable on one of the copper wires 24 by simply inserting the protruding end 56 of the wire 24 through the central opening 86 and sliding the pre-placeable collar 82 down the wire 24 and into the depressed well 54. To that end, two pre-placeable collars 82 may be deployed at each of the copper tabs 44 of the two lower ring carriers 28—one for each copper wire 24 that extends up through the copper tab 44. And while many techniques exist for constructing the pre-placeable collar(s) 82, one suitable technique involves fashioning many collars 82 into a braze material sheet 88 of the desired braze composition, as illustrated in FIG. 9. Metalworking procedures such as stamping, laser cutting, water jet blasting, plasma cutting, and milling, among others, may be used to fashion many pre-placeable collars 82 into the braze material sheet 88 together with a severable retention tie 90.

Once the pre-placeable solid brazing material 80 is placed next to the copper wire 24 within the depressed well 54, the protruding end 56 of the copper wire 24 is brazed to the copper tab 44 by the arc welding/brazing apparatus. The brazing process proceeds along the same four phases discussed above with respect to the autogenous arc welding embodiment and depicted in FIGS. 8A-8D. That is, an arc initiation phase, a wire retraction phase, a wire advancement phase, and a wire extinguishment phase are all carried out with the opportunity to program and adjust the same weld parameters (e.g., arc initiation current, wire retraction velocity, retraction phase current, retraction phase time, wire advancement velocity, wire advancement time, etc.) to affect the heat flux and the overall heat input into the copper wire 24. The heat generated by the arc brazing process, however, may be controlled to melt the brazing material 80 only and not the copper wire 24—unlike before with the autogenous arc welding process—due to the fact that the brazing material 80 can be fully melted at a lower temperature than the melting temperature of copper. Upon being melted, the brazing material 80 flows around and wets both the copper wire 24 and the copper tab 44 within the depressed well 54. The melted brazing material eventually solidifies into a braze joint 90 after the arc 74 is extinguished.

The above description of preferred exemplary embodiments and related examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of joining a first copper piece to a second copper piece, the method comprising:
   protracting a non-consumable electrode wire forward along a longitudinal axis such that a leading tip end of the non-consumable electrode wire makes contact with the first copper piece, the non-consumable electrode wire being in electrical communication with a weld control that is configured to supply DC electrical current to the non-consumable electrode wire in a straight polarity orientation;
   supplying the DC electrical current to the non-consumable electrode wire while the leading tip end of the non-consumable electrode wire and the first copper piece are in contact;
   retracting the non-consumable electrode wire rearward along the longitudinal axis while the DC electrical current is being supplied to the non-consumable electrode wire to strike an arc across a gap established between the leading tip end of the non-consumable electrode wire and the first copper piece; and
   protracting the non-consumable electrode wire forward along the longitudinal axis until the leading tip end of the non-consumable electrode wire again makes contact with the first copper piece and extinguishes the arc, and wherein an input of heat from current flowing through the arc when the arc is established heats the first copper piece such that the first copper piece becomes joined to the second copper piece.

2. The method set forth in claim 1, wherein retracting the non-consumable electrode wire comprises retracting the non-consumable electrode wire to place the leading tip end of the non-consumable electrode wire at a standoff distance away from the first copper piece.

3. The method set forth in claim 2, further comprising:
   maintaining the leading tip end of the non-consumable electrode wire at the standoff distance while the arc is struck before protracting the non-consumable electrode wire forward and extinguishing the arc.

4. The method set forth in claim 2, further comprising:
retracting the non-consumable electrode wire further so that the leading tip end of the non-consumable electrode wire is brought to a distance farther away from the first copper piece than the standoff distance, such retraction of the non-consumable electrode wire occurring while the arc is struck and before protracting the non-consumable electrode wire forward and extinguishing the arc.

5. The method set forth in claim 1, wherein the first copper piece is a copper wire of an electromagnetic polyphase stator winding, and the second copper piece is a copper tab held by a polymer body of a lower ring portion of a connection ring, and wherein a protruding end of the copper wire is received through a hole in the copper tab.

6. The method set forth in claim 1, wherein the non-consumable electrode wire is a tungsten wire.

7. The method set forth in claim 1, wherein the input of heat causes the first copper piece and the second copper piece to melt and coalesce, and wherein, upon extinguishment of the arc, melted portions of the first copper piece and the second copper piece solidify to form an autogenous weld joint between the first copper piece and the second copper piece.

8. The method set forth in claim 1, wherein the input of heat causes a pre-placed brazing material to melt, but does not cause either the first copper piece or the second copper piece to melt, and wherein, upon extinguishment of the arc, melted brazing material solidifies to form a braze joint between the first copper piece and the second copper piece.

9. The method set forth in claim 8, further comprising:
placing a pre-placeable solid brazing material next to the first copper piece and the second copper piece.

10. The method set forth in claim 1, further comprising:
retracting the non-consumable electrode wire rearward along the longitudinal axis after the arc has been extinguished to separate the leading tip end of the non-consumable electrode wire from the first copper piece without again striking an arc.

11. A method of joining a first copper piece to a second copper piece, the method comprising:
protracting a non-consumable electrode wire forward along a longitudinal axis such that a leading tip end of the non-consumable electrode wire makes contact with the first copper piece, the non-consumable electrode wire being in electrical communication with a weld control that is configured to supply DC electrical current to the non-consumable electrode wire in a straight polarity orientation;
supplying the DC electrical current to the non-consumable electrode wire while the leading tip end of the non-consumable electrode wire and the first copper piece are in contact;
retracting the non-consumable electrode wire rearward along the longitudinal axis to place the leading tip end of the non-consumable electrode wire at a standoff distance away from the first copper piece, the retraction of the non-consumable electrode wire striking an arc across a gap established between the leading tip end of the non-consumable electrode wire and the first copper piece;
maintaining the leading tip end of the non-consumable electrode wire at the standoff distance or further retracting the non-consumable electrode wire so that the leading tip end of the non-consumable electrode wire is brought to a distance farther away from the first copper piece that is greater than the standoff distance;
protracting the non-consumable electrode wire forward along the longitudinal axis until the leading tip end of the non-consumable electrode wire again makes contact with the first copper piece and extinguishes the arc; and
retracting the non-consumable electrode wire rearward along the longitudinal axis after the arc has been extinguished to separate the leading tip end of the non-consumable electrode wire from the first copper piece without again striking an arc, and wherein an input of heat from current flowing through the arc when the arc is established heats the first copper piece such that the first copper piece becomes joined to the second copper piece.

12. The method set forth in claim 11, wherein the input of heat causes the first copper piece and the second copper piece to melt and coalesce, and wherein, upon extinguishment of the arc, melted portions of the first copper piece and the second copper piece solidify to form an autogenous weld joint between the first copper piece and the second copper piece.

13. The method set forth in claim 11, wherein the input of heat causes a pre-placed brazing material to melt, but does not cause either the first copper piece or the second copper piece to melt, and wherein, upon extinguishment of the arc, melted brazing material solidifies to form a braze joint between the first copper piece and the second copper piece.

14. The method set forth in claim 11, wherein the current flowing through the arc remains constant when the arc is established.

15. A method of joining a copper wire of an electromagnetic polyphase stator winding to a copper tab of a connection ring without damaging more heat-sensitive materials nearby, the method comprising:
fitting a lower ring carrier onto the electromagnetic polyphase stator winding such that the copper wire of the electromagnetic polyphase stator winding is received through a hole in a copper tab of the lower ring carrier, the copper tab of the lower ring carrier being held within a polymer body;
protracting a non-consumable electrode wire forward along a longitudinal axis such that a leading tip end of the non-consumable electrode wire makes contact with a protruding end of the copper wire received through the hole in the copper tab, the non-consumable electrode wire being in electrical communication with a weld control that is configured to supply DC electrical current to the non-consumable electrode wire in a straight polarity orientation;
supplying the DC electrical current to the non-consumable electrode wire while the leading tip end of the non-consumable electrode wire and the protruding end of the copper wire are in contact;
retracting the non-consumable electrode wire rearward along the longitudinal axis to place the leading tip end of the non-consumable electrode wire at a standoff distance away from the protruding end of the copper wire such that an arc is struck across a resulting gap between the leading tip end of the non-consumable electrode wire and the protruding end of the copper wire;
maintaining the leading tip end of the non-consumable electrode wire at the standoff distance or further retracting the non-consumable electrode wire so that the leading tip end of the non-consumable electrode wire is brought to a distance farther away from the protruding end of the copper wire than the standoff distance; and protracting the non-consumable electrode wire forward along the longitudinal axis until the leading tip end of the non-consumable electrode wire again makes contact with the protruding end of the copper wire and extinguishes the arc, and wherein an input of heat from current flowing through the arc when the arc is established heats the protruding end of the copper wire such that the protruding end of the copper wire becomes joined to the copper tab of the connection ring.

16. The method set forth in claim 15, wherein the input of heat causes the copper wire and the copper tab to melt and coalesce, and wherein, upon extinguishment of the arc, melted portions of the copper wire and the copper tab solidify to form an autogenous weld joint.

17. The method set forth in claim 15, further comprising:
placing a pre-placeable solid brazing material next to the copper wire and the copper tab, and wherein the input of heat causes the pre-placeable solid brazing material to melt, but does not cause either the copper wire or the copper tab to melt, and, upon extinguishment of the arc, melted brazing material solidifies to form a braze joint between the copper wire and the copper tab.

18. The method set forth in claim 17, wherein the pre-placeable solid brazing material is a collar having a rim portion that defines a central opening, and wherein placing the pre-placeable solid brazing material next to the copper wire comprises inserting the protruding end of the copper wire through the central opening of the collar and sliding the collar down the copper wire so that the collar rests against the copper tab.

19. The method set forth in claim 17, wherein the pre-placeable solid brazing material is composed of a copper-silver-phosphorus braze composition having a liquidus temperature below a melting point of copper.

20. The method set forth in claim 16, wherein the non-consumable electrode wire is a tungsten wire.

* * * * *